US009240066B2

(12) United States Patent
Yu et al.

(10) Patent No.: US 9,240,066 B2
(45) Date of Patent: Jan. 19, 2016

(54) METHODS AND APPARATUSES FOR FACILITATING SKELETAL ANIMATION

(76) Inventors: Kun Yu, Beijing (CN); Hao Wang, Beijing (CN); Danli Wang, Beijing (CN); Chunlong Yu, Beijing (CN)

( * ) Notice: Subject to any disclaimer, the term of this patent is extended or adjusted under 35 U.S.C. 154(b) by 271 days.

(21) Appl. No.: 13/581,881

(22) PCT Filed: Mar. 2, 2010

(86) PCT No.: PCT/CN2010/070830
§ 371 (c)(1),
(2), (4) Date: Aug. 30, 2012

(87) PCT Pub. No.: WO2011/106928
PCT Pub. Date: Sep. 9, 2011

(65) Prior Publication Data
US 2012/0327090 A1    Dec. 27, 2012

(51) Int. Cl.
*G06T 13/40*    (2011.01)

(52) U.S. Cl.
CPC ................................... *G06T 13/40* (2013.01)

(58) Field of Classification Search
None
See application file for complete search history.

(56) References Cited

U.S. PATENT DOCUMENTS

| 4,600,919 | A | * | 7/1986 | Stern | 345/473 |
|---|---|---|---|---|---|
| 5,929,867 | A | | 7/1999 | Herbstman et al. | |
| 5,986,675 | A | * | 11/1999 | Anderson et al. | 345/473 |
| 6,011,562 | A | | 1/2000 | Gagne et al. | |
| 2003/0023347 | A1 | | 1/2003 | Konno et al. | |
| 2005/0232587 | A1 | | 10/2005 | Strawn et al. | |
| 2006/0274070 | A1 | | 12/2006 | Herman et al. | |
| 2009/0142029 | A1 | | 6/2009 | Lin et al. | |
| 2009/0325691 | A1 | * | 12/2009 | Loose | 463/30 |
| 2011/0018880 | A1 | * | 1/2011 | Whited et al. | 345/473 |

FOREIGN PATENT DOCUMENTS

| CN | 1945632 A | 4/2007 |
|---|---|---|
| CN | 1991911 A | 7/2007 |
| WO | 97/40471 A1 | 10/1997 |

OTHER PUBLICATIONS

Tanco, Luis Molina, and Adrian Hilton. "Realistic synthesis of novel human movements from a database of motion capture examples." Human Motion, 2000. Proceedings. Workshop on. IEEE, 2000.*
Lee, Jehee, et al. "Interactive control of avatars animated with human motion data." ACM Transactions on Graphics (TOG). vol. 21. No. 3. ACM, 2002.*
Jeong, Il-Kwon, et al. "Implementation of a motion editing system." Virtual Systems and Multimedia, 2001. Proceedings. Seventh International Conference on. IEEE, 2001.*

(Continued)

*Primary Examiner* — Daniel Hajnik
(74) *Attorney, Agent, or Firm* — Alston & Bird LLP (57) ABSTRACT

Methods and apparatuses for facilitating skeletal animation are provided. A method may include determining a holistic motion path for a skeletal animation. The method may further include determining, independently of the determination of the holistic motion path, a limb animation for the skeletal animation based at least in part upon a plurality of skeletal key frames. The method may additionally include generating the skeletal animation by correlating the holistic motion path with the limb animation. Corresponding apparatuses are also provided.

14 Claims, 7 Drawing Sheets

(56) References Cited

OTHER PUBLICATIONS

Park, Sang Il, Hyun Joon Shin, and Sung Yong Shin. "On-line locomotion generation based on motion blending." Proceedings of the 2002 ACM SIGGRAPH/Eurographics symposium on Computer animation. ACM, 2002.*

Oshita, Masaki. "Pen-to-mime: A pen-based interface for interactive control of a human figure." Proceedings of the First Eurographics conference on Sketch-Based Interfaces and Modeling. Eurographics Association, 2004.*

Davis et al., "A Sketching Interface for Articulated Figure Animation", Proceedings of the 2003 ACM SIGGRAPH/Eurographics Symposium on Computer animation, 2003, pp. 320-328.

International Search Report and Written Opinion received for corresponding Patent Cooperation Treaty Application No. PCT/CN2010/070830, dated Dec. 9, 2010, 11 pages.

* cited by examiner

METHODS AND APPARATUSES FOR FACILITATING SKELETAL ANIMATION

RELATED APPLICATION

This application was originally filed as PCT Application No. PCT/CN2010/070830 filed Mar. 2, 2010.

TECHNOLOGICAL FIELD

Embodiments of the present invention relate generally to computer animation technology and, more particularly, relate to methods, and apparatuses for facilitating skeletal animation.

BACKGROUND

The modern computing era has brought about a tremendous expansion in computing power as well as increased affordability of computing devices. This expansion in computing power has led to a reduction in the size of computing devices and given rise to a new generation of mobile devices that are capable of performing functionality that only a few years ago required processing power provided only by the most advanced desktop computers. Consequently, mobile computing devices having a small form factor have become ubiquitous and are used for execution of a wide range of applications.

Many users of computing devices enjoy viewing skeletal animations on their computing devices. Consequently, skeletal animations are becoming increasingly widely distributed and are exchanged between users over networks, such as the internet. However, in spite of the increasing popularity and pervasiveness of skeletal animations, the creation of skeletal animations continues to be a time consuming process requiring a skilled designer.

BRIEF SUMMARY

Methods, apparatuses, and computer program products are herein provided for facilitating skeletal animation. Systems, methods, apparatuses, and computer program products in accordance with various embodiments may provide several advantages to computing devices and computing device users. Example embodiments provide a user intuitive method for generating skeletal animation that allows a user to define limb animation for the skeletal animation independently of a holistic motion path for the skeletal animation. Some example embodiments allow a user to define a plurality of skeletal key frames for a skeletal animation and display representations of the skeletal key frames in a user interface portion for defining limb animation to allow a user to intuitively define limb animation transitions between skeletal key frames. Some example embodiments further provide a user interface portion for defining the holistic motion path of a skeleton in a skeletal animation that may be separate from the user interface portion for defining limb animation. In this regard, embodiments wherein definition of the limb animation is separated from definition of the holistic motion path allow users to concentrate on skeletal pose adjustment independent of any concern with the holistic motion path of the skeletal animation.

Some example embodiments further provide for testing the skeletal animation or portions thereof prior to recording the animation. Accordingly, users may be provided with an intuitive way to adjust portions of the animation based on the tests. Additionally, user interfaces provided by some example embodiments allow users to generate skeletal animations on mobile devices and/or using inputs to a touch screen display. In this regard, users may be enabled to relatively quickly create a skeletal animation and distribute the skeletal animation over a network.

In a first example embodiment, a method is provided, which comprises determining a holistic motion path for a skeletal animation. The method of this embodiment further comprises determining, independently of the determination of the holistic motion path, a limb animation for the skeletal animation based at least in part upon a plurality of skeletal key frames. The method of this embodiment additionally comprises generating the skeletal animation by correlating the holistic motion path and the limb animation.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least determine a holistic motion path for a skeletal animation. The at least one memory and stored computer program code are configured, with the at least one processor, to further cause the apparatus of this embodiment to determine, independently of the determination of the holistic motion path, a limb animation for the skeletal animation based at least in part upon a plurality of skeletal key frames. The at least one memory and stored computer program code are configured, with the at least one processor, to additionally cause the apparatus of this embodiment to generate the skeletal animation by correlating the holistic motion path and the limb animation.

In another example embodiment, a computer program product is provided. The computer program product of this embodiment includes at least one computer-readable storage medium having computer-readable program instructions stored therein. The program instructions of this embodiment comprise program instructions configured to determine a holistic motion path for a skeletal animation. The program instructions of this embodiment further comprise program instructions configured to determine, independently of the determination of the holistic motion path, a limb animation for the skeletal animation based at least in part upon a plurality of skeletal key frames. The program instructions of this embodiment additionally comprise program instructions configured to generate the skeletal animation by correlating the holistic motion path and the limb animation.

In another example embodiment, a computer-readable storage medium carrying computer-readable program instructions is provided. The computer-readable program instructions of this embodiment comprise program instructions configured to determine a holistic motion path for a skeletal animation. The computer-readable program instructions of this embodiment further comprise program instructions configured to determine, independently of the determination of the holistic motion path, a limb animation for the skeletal animation based at least in part upon a plurality of skeletal key frames. The computer-readable program instructions of this embodiment additionally comprise program instructions configured to generate the skeletal animation by correlating the holistic motion path and the limb animation.

In another example embodiment, an apparatus is provided that comprises means for determining a holistic motion path for a skeletal animation. The apparatus of this embodiment further comprises means for determining, independently of the determination of the holistic motion path, a limb animation for the skeletal animation based at least in part upon a plurality of skeletal key frames. The apparatus of this embodiment additionally comprises means for generating the skeletal animation by correlating the holistic motion path and the limb animation.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
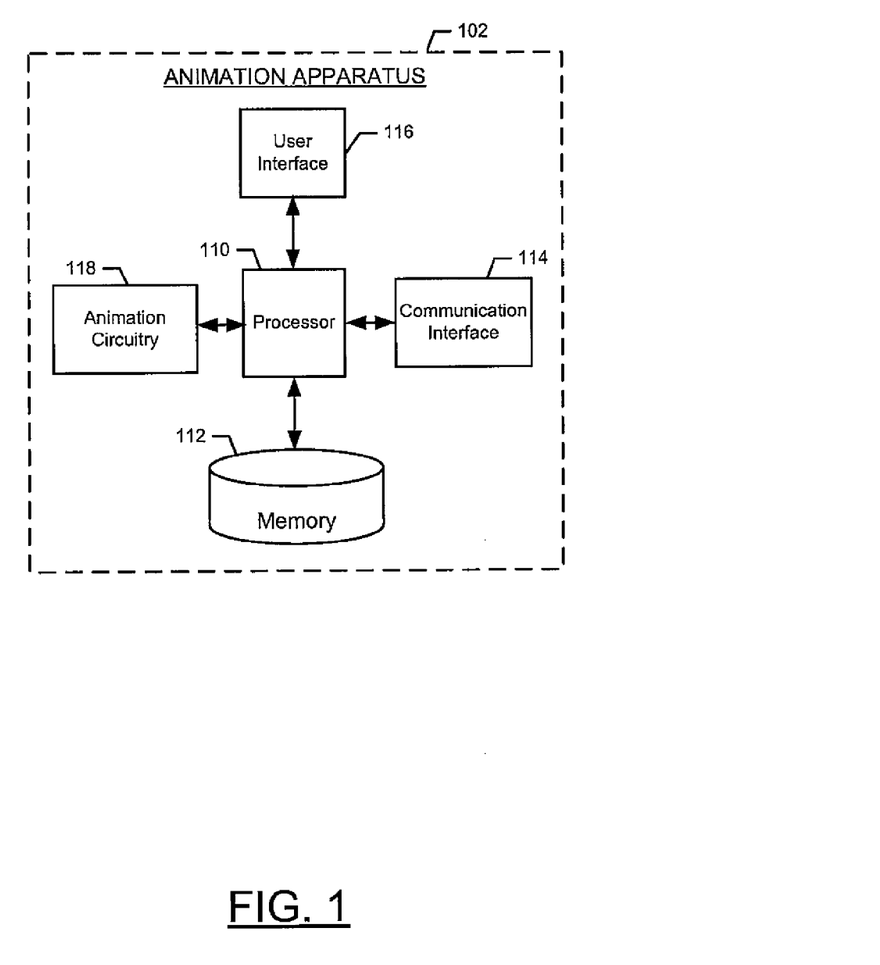
FIG. 1 illustrates a block diagram of an animation apparatus for facilitating skeletal animation according to an example embodiment of the present invention.

FIG. 1 illustrates a block diagram of an animation apparatus 102 for facilitating skeletal animation according to an example embodiment of the present invention. It will be appreciated that the animation apparatus 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an animation apparatus for facilitating skeletal animation, numerous other configurations may also be used to implement embodiments of the present invention.

The animation apparatus 102 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, any combination thereof, and/or the like. In an example embodiment, the animation apparatus 102 is embodied as a mobile terminal, such as that illustrated in FIG. 2.

Figure 2:
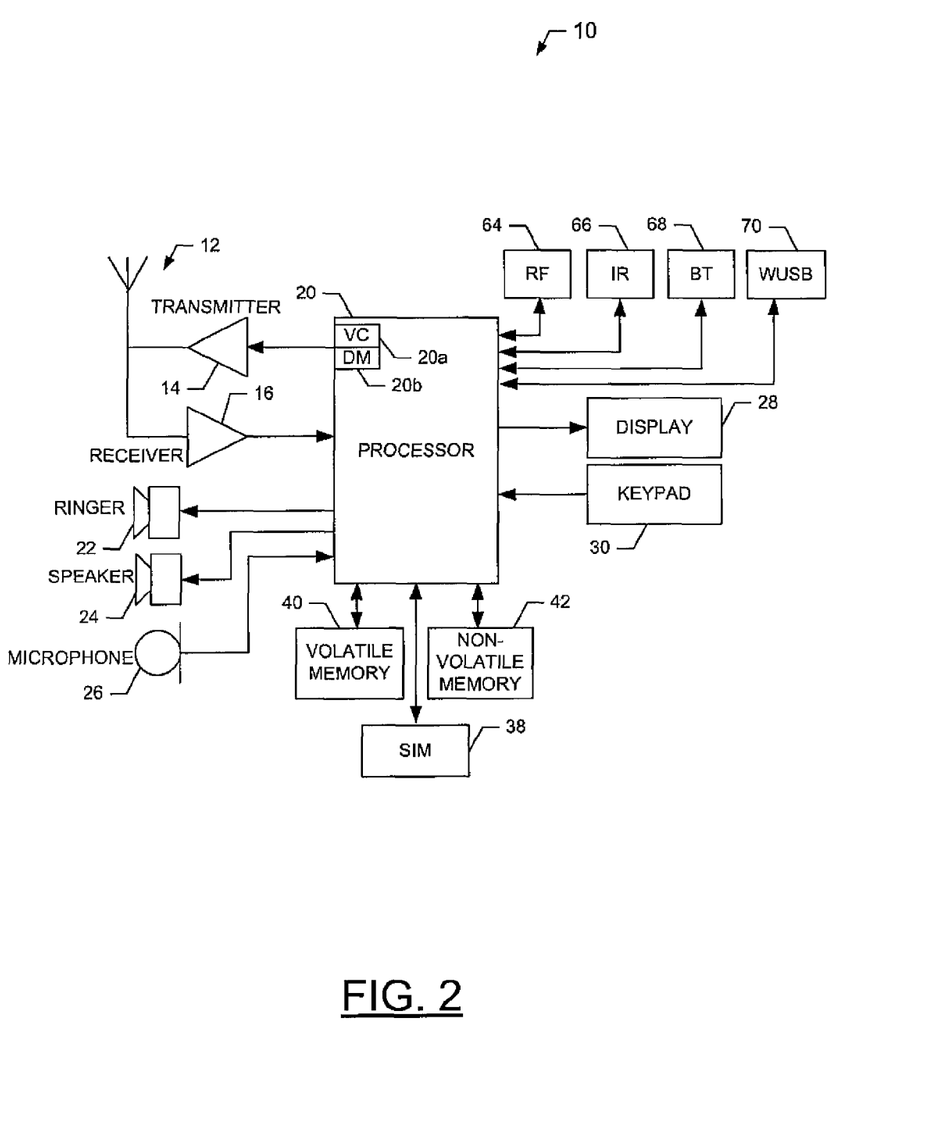
FIG. 2 is a schematic block diagram of a mobile terminal according to an example embodiment of the present invention.

In this regard, FIG. 2 illustrates a block diagram of a mobile terminal 10 representative of one embodiment of an animation apparatus 102. It should be understood, however, that the mobile terminal 10 illustrated and hereinafter described is merely illustrative of one type of animation apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the interne or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the animation apparatus 102 includes various means, such as a processor 110, memory 112, communication interface 114, user interface 116, and animation circuitry 118 for performing the various functions herein described. These means of the animation apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the animation apparatus 102 as described herein. The plurality of processors may be embodied on a single computing device or distributed across a plurality of computing devices collectively configured to function as the animation apparatus 102. In embodiments wherein the animation apparatus 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the animation apparatus 102 to perform one or more of the functionalities of the animation apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the animation apparatus 102. In various example embodiments, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the animation apparatus 102 is embodied as a mobile terminal 10, the memory 112 may comprise the volatile memory 40 and/or the non-volatile memory 42. The memory 112 may be configured to store information, data, applications, instructions, or the like for enabling the animation apparatus 102 to carry out various functions in accordance with example embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. The stored information may include, for example, skeletal animation(s), skeletal key frame(s) for a skeletal animation, a skeleton, and/or the like. This stored information may be stored and/or used by the animation circuitry 118 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to an entity. For example, the communication interface 114 may be configured to communicate with a server, network node, user terminal, and/or the like over a network for purposes of disseminating a skeletal animation generated on the animation apparatus 102. As another example, in embodiments wherein the animation apparatus 102 comprises a server, network node, or the like, the communication interface 114 may be configured to communicate with a remote user terminal (e.g., the user terminal 304) to allow a user of the remote user terminal to access functionality provided by the animation apparatus 102. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the animation apparatus 102 and one or more computing devices are in communication. The communication interface 114 may additionally be in communication with the memory 112, user interface 116, and/or animation circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the animation apparatus 102 is embodied as one or more servers, aspects of the user interface 116 may be reduced or the user interface 116 may even be eliminated. The user interface 116 may be in communication with the memory 112, communication interface 114, and/or animation circuitry 118, such as via a bus.

The animation circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the animation circuitry 118 is embodied separately from the processor 110, the animation circuitry 118 may be in communication with the processor 110. The animation circuitry 118 may further be in communication with one or more of the memory 112, communication interface 114, or user interface 116, such as via a bus.

Figure 3:
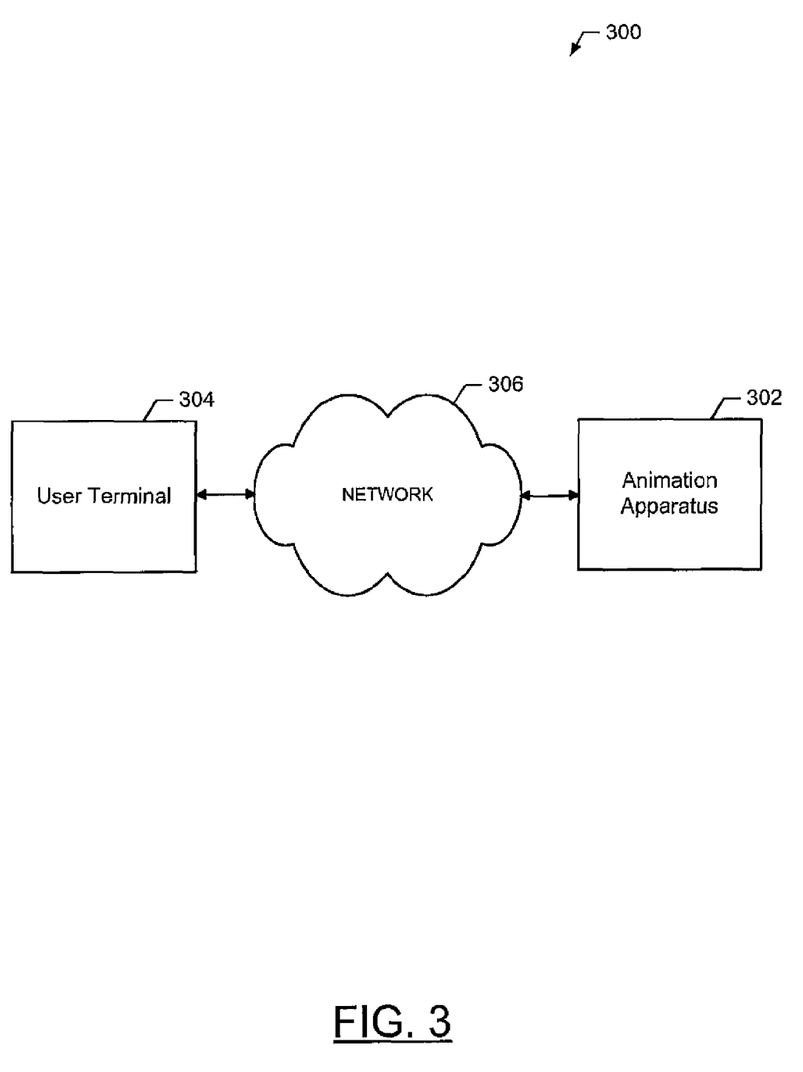
FIG. 3 illustrates a system for facilitating skeletal animation according to an example embodiment of the invention.

FIG. 3 illustrates a system 300 for facilitating skeletal animation according to an example embodiment of the invention. In this regard, the system 300 comprises a system according to an example embodiment for facilitating skeletal animation. The system 300 comprises an animation apparatus 302 and a user terminal 304 configured to communicate over the network 306. The animation apparatus 302 may, for example, comprise an embodiment of the animation apparatus 102 wherein the animation apparatus 102 is embodied as one or more servers, one or more network nodes, or the like that is configured to provide skeletal animation services to a user of a remote user terminal. The user terminal 304 may comprise any computing device configured to access the network 306 and communicate with the animation apparatus 302 in order to access skeletal animation services provided by the animation apparatus 302. The user terminal 304 may, for example, be embodied as a desktop computer, laptop computer, mobile terminal, mobile computer, mobile phone, mobile communication device, mobile terminal 10, game device, digital camera/camcorder, audio/video player, television device, radio receiver, digital video recorder, positioning device, any combination thereof, and/or the like. The network 306 may comprise a wireline network, wireless network (e.g., a cellular network, wireless local area network, wireless wide area network, some combination thereof, or the like), or a combination thereof, and in one embodiment comprises the internet.

In the example system illustrated in FIG. 3, at least some aspects of the user interface 116 may be embodied on the user terminal 304. For example, the animation apparatus 302 may be configured to provide a network service, such as a web service, for providing skeletal animation services to one or more user terminals 304. In this regard, the animation apparatus 302 (e.g., animation circuitry 118) may be configured to provide a graphical user interface for facilitating skeletal animation to the user terminal 304 such that the graphical user interface is caused to be displayed on a display of the user terminal 304. A user of the user terminal 304 may then interact with the graphical user interface to define one or more aspects of a skeletal animation, such as a skeleton, a skeletal key frame, a holistic motion path, a sequence of skeletal key frames for defining limb animation, and/or the like. Therefore, it will be appreciated that where the animation circuitry 118 is described to cause a graphical user interface, skeletal key frame, skeleton, some other image, data, and/or the like to be displayed, the animation circuitry 118 may be causing display on a display operably connected to the animation apparatus 102 or may be causing display on a display of a remote user terminal to which data is transmitted over a network. The animation apparatus 302 (e.g., animation circuitry 118) may be configured to receive aspects of a skeletal animation defined by the user of a user terminal 304 and generate a skeletal animation using the defined aspects in accordance with one or more example embodiments described further herein. Accordingly, it will be appreciated that where the animation circuitry 118 is described to be configured to determine a user input and/or to make a determination based on user input, the animation circuitry 118 may be configured make the determination based on user input to a user interface 116 of the animation apparatus 102 or may be configured to make the determination based on a user input to a remote user terminal, an indication of which is transmitted to the animation apparatus 102 over a network.

In another example embodiment of the system 300, aspects of the animation circuitry 118 may be distributed between the user terminal 304 and animation apparatus 302. In this example embodiment, the animation apparatus 302 may handle certain processing tasks required for generating a skeletal animation while presentation of a graphical user interface for facilitating skeletal animation and/or definition of one or more aspects of a skeletal animation is handled by the user terminal 304. For example, a holistic motion path and limb animation may be defined and determined on a user terminal 304, which may then provide the holistic motion path and limb animation to an animation apparatus 302 so that the animation apparatus 302 is enabled to generate a skeletal animation by correlating the holistic motion path and the limb animation. In this regard, the user terminal 304 may not be required to perform more processor-intensive steps for generating a skeletal animation.

Figure 4:
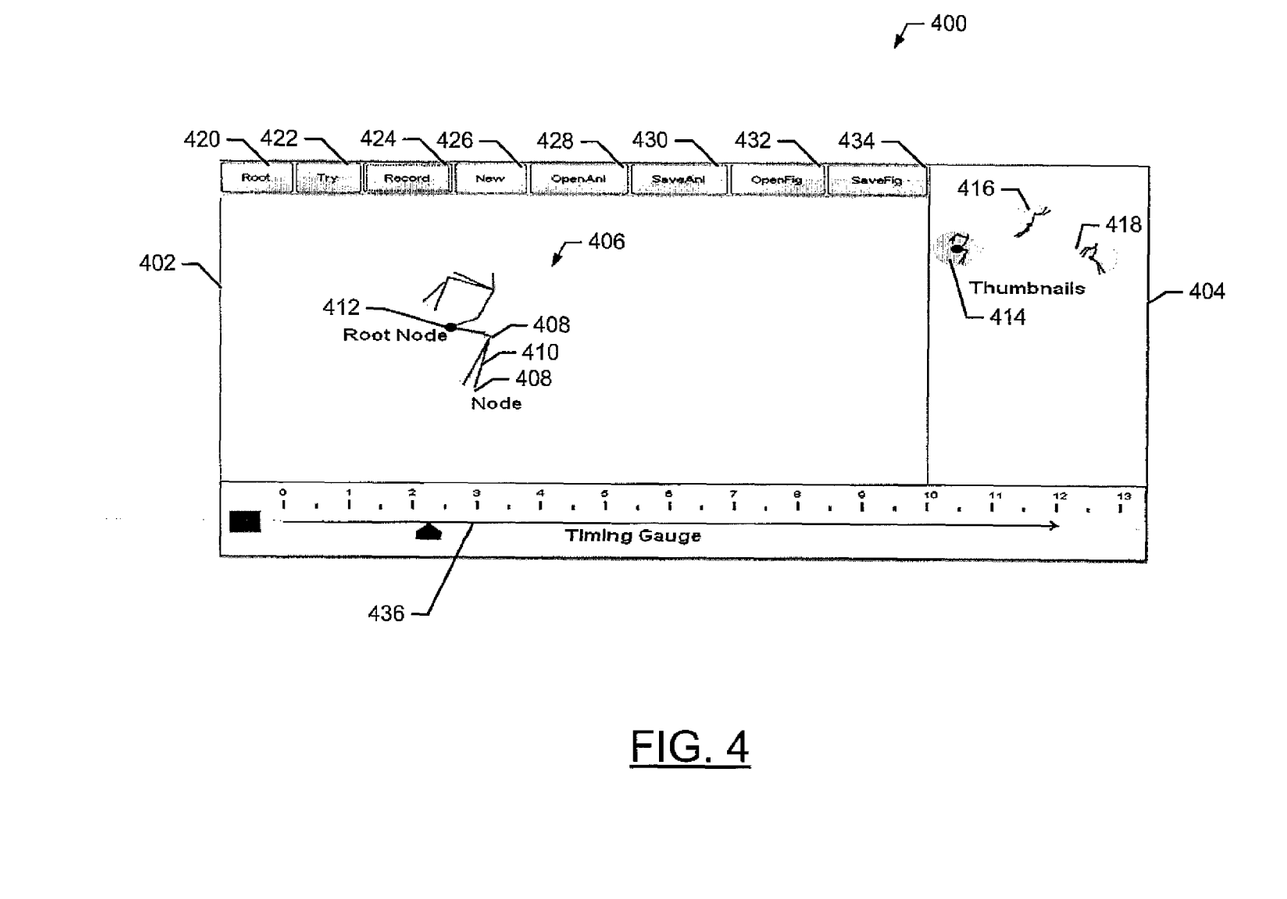
FIG. 4 illustrates a user interface for facilitating skeletal animation according to an example embodiment of the invention.

The animation circuitry 118 may be configured to determine a skeleton for use in a skeletal animation. The determination of the skeleton may be made based on user input, such as to the user interface 116. The user input may, for example, comprise interaction with a touch screen display, manipulation of a drawing cursor with a mouse, and/or other input allowing a user to define a skeleton. The user input may comprise user interaction with a graphical user interface that the animation circuitry 118 causes to be displayed. For example, FIG. 4 illustrates an example graphical user interface 400 for facilitating skeletal animation that the animation circuitry 118 may cause to be displayed. The user may, for example, provide user input for sketching a skeleton in the user interface portion 402 of the graphical user interface 400.

Referring briefly to FIG. 4, the graphical user interface 400 comprises two user interface portions. The first user interface portion 402 may be used by a user for drawing a skeleton, posing a skeleton to develop skeletal key frames, and/or for defining a holistic motion path for a skeletal animation. The second user interface portion 404 may display representations of skeletal key frames created by the user and may be used by a user to define a sequence of skeletal key frames for a skeletal animation such that the animation circuitry 118 may determine a limb animation, as will be described further herein below. Accordingly, separate user interface portions may be provided for defining a holistic motion path for a skeletal animation and for defining limb animation so as to provide a user-intuitive way to enable determination of limb animation independent from determination of a holistic path. The graphical user interface 400 may additionally comprise a plurality of command buttons for controlling operation of the graphical user interface and for facilitating creation of a skeletal animation. Several example command buttons 420-434 are illustrated in FIG. 4. It will be appreciated, however, that these command buttons are provided merely for purposes of example and other embodiments may include additional command buttons or alternative command buttons. Functionality of some example command buttons will be described further herein below.

Returning now to determination of a skeleton, a skeleton may be defined by a plurality of nodes connected by a plurality of limbs. In this regard, a user may draw a skeleton by drawing a plurality of lines (e.g. limbs), which may be connected at nodes. The animation circuitry 118 may be configured to cause limbs and nodes of a skeleton to be displayed in response to user input for drawing the skeleton. For example, when a touch screen display is used to draw a skeleton, a user may draw a limb by sliding a finger, stylus, pen, or other touch screen input device across the touch screen display. When contact is broken between the touch screen display and the touch screen input device, a node may be automatically appended to the limb by the animation circuitry 118. As another example, when a mouse is used to draw a skeleton, the user may click on a button of the mouse and move a cursor across a display screen to define a limb. When the user releases the clicked button, a node may be appended to the end of the limb by the animation circuitry 118. Accordingly, a skeleton may be defined by the user drawing multiple limbs connected at one or more nodes. An example skeleton 406 is illustrated in FIG. 4. The skeleton 406 includes a plurality of nodes connected by limbs. One such limb 410 is labeled and is appended with the nodes 408. The user may further designate one of the nodes of the skeleton as a root node. The root node may comprise a fixed node of the skeleton in relation to which all limb and/or holistic motion of the skeleton occurs. The node 412 has been designated as the root node of the skeleton 406. The user may, for example, designate a root node by clicking on, tapping, or otherwise selecting a node in conjunction with selecting a root node selection function of a graphical user interface (e.g., the "Root" command button 420 of the graphical user interface 400).

After drawing a skeleton, the user may manipulate and pose the skeleton within a user interface portion, such as, for example, the user interface portion 402 of the graphical user interface 400. For example, the user may be able to pose a skeleton by moving a node of the skeleton (e.g., with a mouse, track ball, touch screen input, and/or the like). When the user moves a non-root node (e.g., one of the nodes 408 of the skeleton 406), the user may be able to pose limbs connected to the node in relation to the root node (e.g., the root node 412 of the skeleton 406). Accordingly, movement of a limb(s) may be based on physical constraints imposed by the root node of the skeleton. If the user moves a root node (e.g., the root node 412 of the skeleton 406), the user may move the entire skeleton within the user interface portion.

Figure 5:
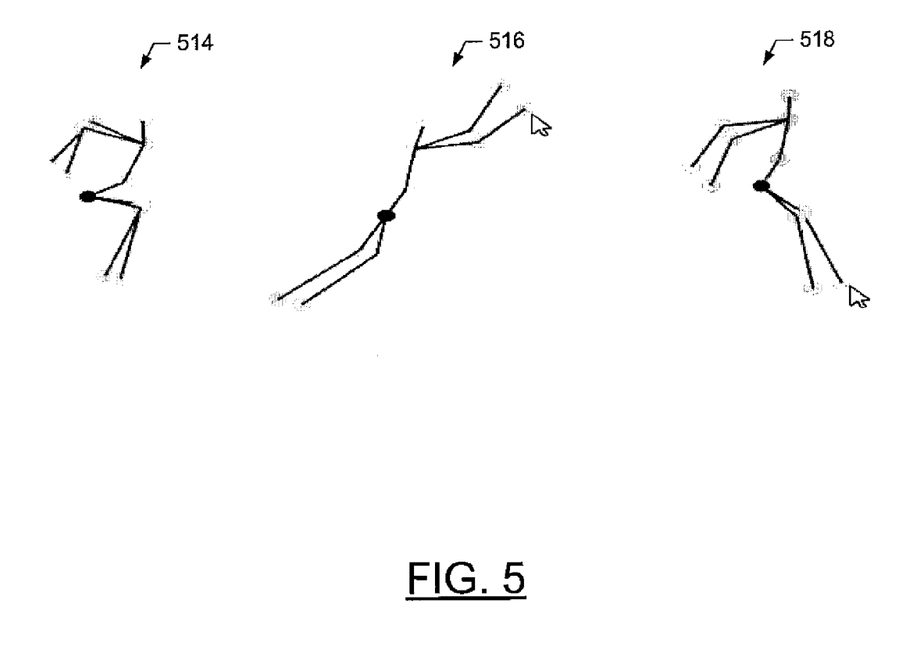
FIG. 5 illustrates three skeletal key frames created according to an example embodiment of the invention.

When the user completes a posing of the skeleton that the user wishes to use as a skeletal key frame in a skeletal animation, the user may select to save the posing as a skeletal key frame. The animation circuitry 118 may be configured to determine the selected skeletal key frame and cause a representation of the skeletal key frame to be displayed in a user interface portion that the user may later use for defining limb animation for a skeletal animation. The displayed representation may comprise any representation or indication of a skeletal key frame and may, for example, comprise a thumbnail representation of the skeletal key frame. In this regard, the user interface portion 404 of the graphical user interface 400 illustrates thumbnails 414-418 representative of the skeletal key frames 514-518, respectively, which are illustrated in FIG. 5.

A user may save a skeleton and/or a posing thereof for further use. For example, the user may select the "SaveFig" button 434 of the graphical user interface 400 to save a skeleton or posing thereof. The animation circuitry 418 may be configured to save the skeleton or posing thereof to the memory 112 in response to the user selection. A user may additionally be able to open a skeleton or posing thereof for editing, posing, or the like. For example, the user may select the "OpenFig" button 432 and may subsequently select a saved skeleton or posing thereof to open from a list of accessible saved skeletons that may be displayed.

In order to generate a skeletal animation, the animation circuitry 118 may be configured to determine a holistic motion path for a skeletal animation and a limb animation for the skeletal animation. In some example embodiments, these determinations are made independently of each other, such as based on user input. The animation circuitry 118 may be configured to generate a skeletal animation by correlating a determined holistic motion path and a determined limb animation. The order in which the holistic motion path and limb animation are determined does not matter.

Figure 6:
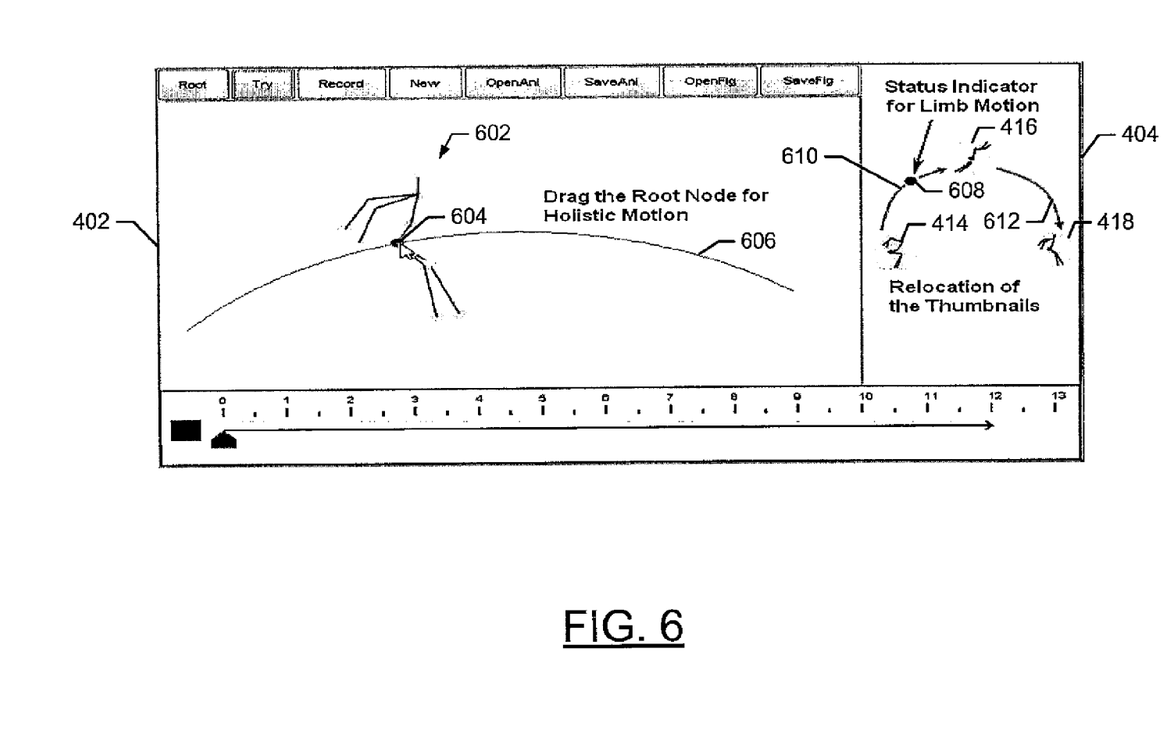
FIG. 6 illustrates a user interface for facilitating skeletal animation according to an example embodiment of the invention.

The animation circuitry 118 may be configured to determine a holistic motion path based on user input defining the holistic motion path. A user may, for example, define a holistic motion path by manipulating a skeleton along a desired path. For example, the user may manipulate the skeleton within a user interface portion for defining the holistic motion path, such as the user interface portion 402 of the graphical user interface 400. In one example embodiment, the user may define a holistic motion path for a skeletal animation by dragging a skeleton by its root node along a desired path. An example of this embodiment is illustrated in FIG. 6, wherein the skeleton 602 is being dragged by its root node 604 along the path 606 within the user interface portion 402.

When defining a holistic motion path, a user may manipulate a skeleton, such as by its root node, by using any appropriate input means. One example input means is input to a touch screen display on which the skeleton is displayed, such as by dragging the skeleton along a desired path across the touch screen display with a slide gesture. Another example input means is dragging the skeleton with a mouse.

When determining a holistic motion path, the animation circuitry 118 may further be configured to determine a rate(s) associated with the holistic motion path. The rate(s) may define a rate of traversal of the skeleton along the holistic motion path. The animation circuitry 118 may, for example, determine the rate(s) based on a rate associated with the user input. Thus, for example, the user may, when defining the holistic motion path, drag the skeleton along the desired path at a desired path traversal rate.

Prior to defining a holistic motion path, the user may select a record command option to indicate to the animation circuitry 118 that it should determine and capture the holistic motion path based on the user input. For example, the user may select the "Record" command button 424 of the graphical user interface 400. The animation circuitry 118 may then determine a holistic motion path by determining a path defined by user input in response to the user selecting the record command option. The animation circuitry 118 may be configured to store the determined holistic motion path, such as in memory 112, for later use in generating a skeletal animation based on the determined holistic motion path.

The animation circuitry 118 may additionally be configured to determine a limb animation for a skeletal animation based at least in part upon a plurality of selected skeletal key frames. As described above, in some example embodiments, the order in which the holistic motion path and limb animation for a skeletal animation is determined do not matter so long as they are determined independent of one another. Accordingly, the determination of the limb animation for a skeletal animation may be made prior to or after the determination of the holistic motion path for the skeletal animation.

A user may specify a sequence for a plurality of skeletal key frames which are to be used for generation of limb animation for a skeletal animation. For example, a user may specify an order for skeletal key frames within a user interface portion for defining limb animation, such as the user interface portion 404. In this regard, a user may be able to drag and drop or otherwise position and order representations of skeletal key frames within the user interface portion.

The animation circuitry 118 may be configured to determine a limb animation at least in part by determining an animated transition between each skeletal key frame in a sequence. For example, if there are three skeletal key frames in an animation sequence represented by the thumbnails 414, 416, and 418, the animation circuitry 118 may be configured to determine a limb animation comprising a first animated transition between the skeletal key frame 514 and the skeletal key frame 516 and a second animated transition between the skeletal key frame 516 and the skeletal key frame 518. In order to provide a smooth animated transition between two skeletal key frames, the animation circuitry 118 may be configured to use an interpolation technique to determine the animated transition. It will be appreciated that the animation circuitry 118 may use any appropriate interpolation technique (s) for determining an animated transition. Example interpolation techniques that may be used by the animation circuitry include linear interpolation, polynomial interpolation, spline interpolation, and/or the like.

When determining a limb animation, the animation circuitry 118 may be further configured to determine a transition rate for at least one animated transition between skeletal key frames. In this regard, a transition rate may comprise a rate for limb movement from a pose of a first skeletal key frame to a pose of a second skeletal key frame. A determined transition rate may comprise a constant rate of limb movement for an entirety of a limb animation. Alternatively, each animated transition between skeletal key frames in a limb animation may have a defined transition rate. Thus, for example, a rate of limb movement between skeletal key frames 1 and 2 in a limb animation may be slower than a rate of limb movement between skeletal key frames 2 and 3 in a limb animation.

User input may be used to specify a transition rate, as well as a sequence of transitions between skeletal key frames when defining limb animation for a skeletal animation. Referring again to FIG. 6, for example, a user may provide input to the user interface portion 404 to facilitate the determination of limb animation by the animation circuitry 118. For example, the user may trace a line (e.g., with a touch input to a touch screen display, movement of a cursor with a mouse, and/or the like) between two or more skeletal key frames to indicate that the limb animation should comprise an animated transition between the two or more skeletal key frames. Accordingly, a user may define an animation sequence based on an order of transitions defined by the user.

In FIG. 6, an illustration of a user moving an input cursor 608 along a path 610 between the thumbnail indication 414 of the skeletal key frame 514 and the thumbnail indication 416 of the skeletal key frame 516 is illustrated. In this regard, the user may define a transition between the skeletal key frame 514 and skeletal key frame 516 by tracing the path 610 with the input cursor 608. FIG. 6 further shows an illustration of path 612 from the thumbnail indication 416 to the thumbnail indication 418 that may be traced by the user with the input cursor 608 to define a second transition between the skeletal key frame 516 and the skeletal key frame 518. Accordingly, by tracing the path 610 followed by the path 612, the user may specify an animation sequence comprising limb animations that animate transitions from the skeletal key frame 514 to the skeletal key frame 516 and then to the skeletal key frame 518.

Although the above example described with respect to FIG. 6 is described as having a path 610 and a path 612, it is not necessary that the user make two separate paths, such as by stopping at the end of path 610 before commencing the path 612. In this regard, the path 610 and path 612 may comprise a continuous path defined by the user. Thus, it will be appreciated that the separate reference to the paths 610 and 612 is merely to facilitate description of the two transitions defined. Further, in some embodiments, a path may not need to directly traverse an indication of a skeletal key frame. Thus, the animation circuitry 118 may be configured to determine a transition if a user defined path crosses within a predefined distance of an indication. For example, a user may trace a path from the thumbnail indication 414 to the thumbnail indication 418 without directly traversing the thumbnail indication 416. However, the path may come within a predefined distance of the thumbnail indication 416 such that the animation circuitry determines a first user defined transition between the skeletal key frame 514 and the skeletal key frame 516 and a second user defined transition between the skeletal key frame 516 and the skeletal key frame 518. As another example, a path traced by a user may not directly traverse any thumbnail indication, but may come within a predefined distance of two or more thumbnails such that the animation circuitry 118 may determine one or more user defined transitions.

The animation circuitry 118 may be configured to determine a transition rate for a limb animation based upon user input. For example, the animation circuitry 118 may determine a transition rate based upon a rate at which a user traces a path between a first skeletal key frame and second skeletal key frame in order to define a transition between the first and second skeletal key frame. Thus, with reference to FIG. 6, the animation circuitry 118 may determine a transition rate for the animated transition between skeletal key frames 514 and 516 based on the rate at which the user traces the path 610 with the input cursor 608. The animation circuitry 118 may further determine a transition rate for the animated transition between skeletal key frames 516 and 518 based on the rate at which the user traces the path 612 with the input cursor 608.

Prior to defining a limb animation, the user may select a record command option to indicate to the animation circuitry 118 that it should determine and capture the limb animation based on the user input. For example, the user may select the "Record" command button 424 of the graphical user interface 400. In one example embodiment, the user may need to select the record command option only once prior to defining the holistic motion path and limb animation. The animation circuitry 118 may determine a limb animation by determining an animation sequence, animated transition(s), and/or transition rate(s) defined by user input in response to the user selecting the record command option. The animation circuitry 118 may be configured to store a determined limb animation, such as in memory 112, for later use in generating a skeletal animation based on the determined holistic limb animation.

The animation circuitry 118 may be configured to generate a skeletal animation by correlating a holistic motion path and a limb animation. In this regard, a generated skeletal animation may comprise a skeleton performing limb movements defined by the limb animation while traversing a path defined by the holistic motion path. If the duration time of the holistic motion path is the same as the duration time of the limb animation, the animation circuitry 118 may directly correlate the starting and ending points of the holistic motion path and the limb animation to generate a skeletal animation. If, however, the duration times are different, the animation circuitry 118 may adjust a time of one or more of the holistic motion path or the limb animation, such as by adjusting a rate at which the skeleton traverses the holistic motion path and/or by adjusting a limb animation rate, such that the starting and ending points of the holistic motion path and the limb animation may be correlated. The animation circuitry 118 may perform such an adjustment automatically based on correlation criteria or may prompt a user for input to adjust a timing (e.g., rate) of one or more of the holistic motion path or limb animation. In the graphical user interface 400, the timing gauge 436 may provide an indication of a runtime of a holistic motion path and/or limb animation to facilitate correlation.

Referring again to FIGS. 5 and 6, a correlation of the holistic motion path 604 with a limb animation defined by a transition from skeletal key frame 514 to skeletal key frame 516 and a transition from skeletal key frame 516 to skeletal key frame 518 may result in a generation of a skeletal animation comprising a skeleton broad jumping along the holistic motion path 604. In this regard, the skeletal key frame 514 illustrates a skeleton posed in a squatted position with arms back preparing for a jump. Skeletal key frame 516 illustrates the skeleton posed in a position with arms outstretched and legs back. Skeletal key frame 518 illustrates the skeleton posed in a position with legs forward to allow the skeleton to land and arms back for balance. Further, the holistic motion path 604 comprises an are approximating the trajectory of a broad jump.

Although in this example, the generated skeletal animation only comprises a single skeleton, it will be appreciated that example embodiments allow for the generation of skeletal animations comprising a plurality of skeletons. Thus, a holistic motion path and limb animation may be determined by the animation circuitry 118 for each skeleton to be included in a skeletal animation. The animation circuitry 118 may generate a skeletal animation comprising a plurality of skeletons by correlating each holistic motion path and limb animation pairing to generate a skeletal animation for each skeleton to be included in a composite skeletal animation. The animation circuitry 118 may then generate the composite skeletal animation by combining and time correlating the individual skeletal animations.

After a skeletal animation has been generated, the animation circuitry 118 may store the skeletal animation, such as to memory 112. The animation circuitry 118 may store a skeletal animation in response to a user command to save the animation, such as by selecting the "SaveAni" command button 430. Similarly, the animation circuitry 118 may be configured to retrieve a stored skeletal animation in response, to a user command to open an animation, such as by selecting the "OpenAni" command button 428. The animation circuitry 118 may be configured to provide a blank interface for creating a new skeletal animation in response to a user command to begin creation of a new skeletal animation, such as by selecting the "New" command button 426. In this regard, the animation circuitry 118 may cause display of empty user interface portions 402 and 404 (e.g., without any drawn skeletons, thumbnails, or the like). The communication interface 114 may be configured to transmit a skeletal animation to another device over a network. Accordingly, skeletal animations generated in accordance with an example embodiment may be distributed over a network via any communication method including, for example, in a multimedia messaging service message, as an attachment to an email, and/or the like.

Some example embodiments additionally provide for testing a portion of an animation in a testing mode prior to recording the holistic motion path and/or limb animation. For example, a user may select the "Try" command button 422 of the graphical user interface 400 to enter a testing mode. When in testing mode, a user may define a holistic motion path, one or more transitions between skeletal key frames, and/or the like and view an animated representation(s) of the defined test portion(s) of a skeletal animation. Accordingly, a user may preview an animation and make adjustments, such as to the holistic motion path and/or to one or more skeletal key frames as necessary prior to recording a skeletal animation.

Figure 7:
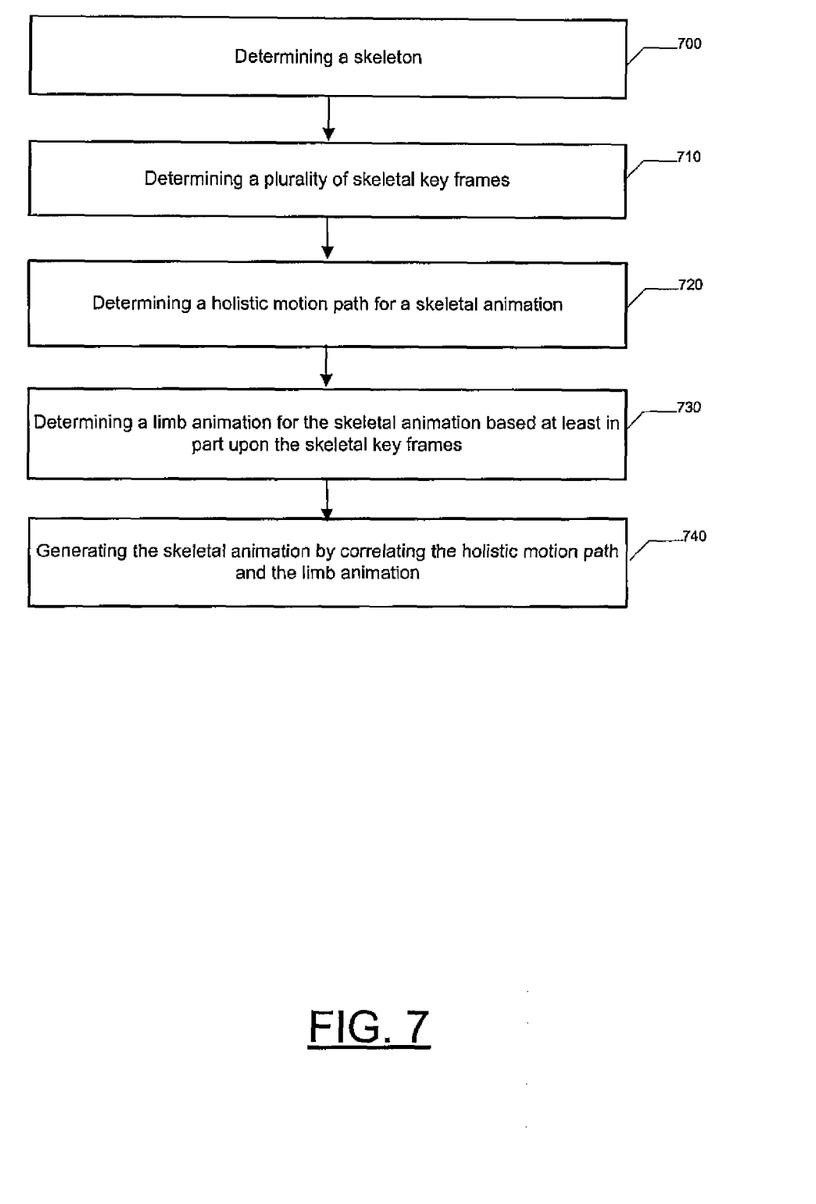
FIG. 7 illustrates a flowchart according to an example method for generating a skeletal animation according to an example embodiment of the invention.

FIG. 7 illustrates a flowchart according to an example method for generating a skeletal animation according to an example embodiment of the invention. The operations illustrated in and described with respect to FIG. 7 may, for example, be performed by and/or under the control of the animation circuitry 118. Operation 700 may comprise determining a skeleton. Operation 710 may comprise determining a plurality of skeletal key frames. Each skeletal key frame may comprise a pose of the skeleton determined in operation 700. Operation 720 may comprise determining a holistic motion path. Operation 730 may comprise determining a limb animation based at least in part on the plurality of skeletal key frames. It will be appreciated that in some example embodiments, operations 720 and 730 may occur in any order so long as the holistic motion path and limb animation are determined independent of one another. Accordingly, the limb animation may be determined prior to determining the holistic motion path. Operation 740 may comprise generating the skeletal animation by correlating the holistic motion path and limb animation.

FIG. 7 is a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., an animation apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions. It will also be understood that one or more blocks of the flowchart, and combinations of blocks in the flowchart, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements. In another embodiment, all or a portion of the elements may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices and computing device users. Example embodiments provide a user intuitive method for generating skeletal animation that allows a user to define limb animation for the skeletal animation independently of a holistic motion path for the skeletal animation. Some example embodiments allow a user to define a plurality of skeletal key frames for a skeletal animation and display representations of the skeletal key frames in a user interface portion for defining limb animation to allow a user to intuitively define limb animation transitions between skeletal key frames. Some example embodiments further provide a user interface portion for defining the holistic motion path of a skeleton in a skeletal animation that may be separate from the user interface portion for defining limb animation. In this regard, embodiments wherein defining the limb animation is separated from defining the holistic motion path allow users to concentrate on skeletal pose adjustment independent of any concern with the holistic motion path of the skeletal animation.

Some example embodiments further provide for testing the skeletal animation or portions thereof prior to recording the animation. Accordingly, users may be provided with an intuitive way to adjust portions of the animation based on the tests. Additionally, user interfaces provided by some example embodiments allow users to generate skeletal animations on mobile devices and/or using inputs to a touch screen display. In this regard, users may be enabled to relatively quickly create a skeletal animation and distribute the skeletal animation over a network.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining a holistic motion path for a skeletal animation including a traversal rate;
   receiving a plurality of skeletal key frames comprising a plurality of nodes connected by a plurality of limbs, wherein the plurality of skeletal key frames is defined by user input to a user interface;
   causing representations of the plurality of skeletal key frames to be displayed in a user interface portion for defining limb animation, wherein the user interface portion for defining limb animation is separate from a user interface portion for defining the holistic motion path;
   determining, independently of the determination of the holistic motion path, a limb animation for the skeletal animation based at least in part upon the plurality of skeletal key frames, wherein determining the limb animation comprises determining a sequence of one or more user defined transitions between a first skeletal key frame and a second skeletal key frame, each user defined transition comprising determining a transition rate defined by a rate of the user input defining a user defined path and determining an animated transition between the first skeletal key frame and the second skeletal key frame based at least in part upon a determined transition rate, wherein determining the user defined transition comprises determining the user defined path between the first skeletal key frame and the second skeletal key frame, the user defined path being defined by a user input to the user interface; and
   generating, with a processor, the skeletal animation by correlating the holistic motion path and the limb animation, wherein generating the skeletal animation comprises determining whether a first duration time associated with the holistic motion path corresponds to a second duration time associated with the limb animation.

2. The method according to claim 1, wherein determining the limb animation for the skeletal animation comprises determining at least one animated transition between skeletal key frames.

3. The method according to claim 2, wherein determining the at least one animated transition comprises using interpolation to determine the at least one animated transition.

4. The method according to claim 2, wherein determining the limb animation further comprises determining a transition rate for at least one animated transition.

5. The method according to claim 1, wherein determining the limb animation comprises determining the limb animation based at least in part upon a defined animation sequence for the plurality of skeletal key frames.

6. The method according to claim 1, wherein the user defined path is defined by a user input to a touch screen display on which the representations of the plurality of skeletal key frames are displayed.

7. The method according to claim 1, wherein determining the holistic motion path for the skeletal animation comprises determining a motion path defined by user manipulation of a skeleton along a path.

8. The method according to claim 7, wherein the user manipulation of the skeleton comprises dragging the skeleton by a root node of the skeleton.

9. An apparatus comprising:
at least one processor and at least one memory storing computer program code, wherein the at least one memory and stored computer program code are configured, with the at least one processor, to cause the apparatus to at least:
determine a holistic motion path for a skeletal animation including a traversal rate;
receive a plurality of skeletal key frames comprising a plurality of nodes connected by a plurality of limbs, wherein the plurality of skeletal key frames is defined by user input to a user interface;
cause representations of the plurality of skeletal key frames to be displayed in a user interface portion for defining limb animation, wherein the user interface portion for defining limb animation is separate from a user interface portion for defining the holistic motion path;
determine, independently of the determination of the holistic motion path, a limb animation for the skeletal animation based at least in part upon the plurality of skeletal key frames, wherein determining the limb animation comprises determining a sequence of one or more user defined transitions between a first skeletal key frame and a second skeletal key frame, each user defined transition comprising determining a transition rate defined by a rate of the user input defining a user defined path and determining an animated transition between the first skeletal key frame and the second skeletal key frame based at least in part upon a determined transition rate, wherein determining the user defined transition comprises determining the user defined path between the first skeletal key frame and the second skeletal key frame, the user defined path being defined by a user input to the user interface; and
generate the skeletal animation by correlating the holistic motion path and the limb animation, wherein generating the skeletal animation comprises determining whether a first duration time associated with the holistic motion path corresponds to a second duration time associated with the limb animation.

10. The apparatus according to claim 9, wherein the at least one memory and stored computer program code are configured, with the at least one processor, to cause the apparatus to determine the limb animation for the skeletal animation at least in part by determining at least one animated transition between skeletal key frames.

11. The apparatus according to claim 10, wherein the at least one memory and stored computer program code are configured, with the at least one processor, to cause the apparatus to determine the at least one animated transition by using interpolation to determine the at least one animated transition.

12. The apparatus according to claim 10, wherein the at least one memory and stored computer program code are configured, with the at least one processor, to further cause the apparatus to determine the limb animation by determining a transition rate for at least one animated transition.

13. The apparatus according to claim 9, wherein the at least one memory and stored computer program code are configured, with the at least one processor, to cause the apparatus to determine the limb animation based at least in part upon a defined animation sequence for the plurality of skeletal key frames.

14. A computer program product comprising at least one non-transitory computer-readable storage medium having computer-readable program instructions stored therein, the computer-readable program instructions comprising program instructions configured to:
determine a holistic motion path for a skeletal animation including a traversal rate;
receive a plurality of skeletal key frames comprising a plurality of nodes connected by a plurality of limbs, wherein the plurality of skeletal key frames is defined by user input to a user interface;
cause representations of the plurality of skeletal key frames to be displayed in a user interface portion for defining limb animation, wherein the user interface portion for defining limb animation is separate from a user interface portion for defining the holistic motion path;
determine, independently of the determination of the holistic motion path, a limb animation for the skeletal animation based at least in part upon a plurality of skeletal key frames, wherein determining the limb animation comprises determining a sequence of one or more user defined transitions between a first skeletal key frame and a second skeletal key frame, each user defined transition comprising determining a transition rate defined by a rate of the user input defining a user defined path and determining an animated transition between the first skeletal key frame and the second skeletal key frame based at least in part upon a determined transition rate, wherein determining the user defined transition comprises determining the user defined path between the first skeletal key frame and the second skeletal key frame, the user defined path being defined by a user input to the user interface; and
generate the skeletal animation by correlating the holistic motion path and the limb animation, wherein generating the skeletal animation comprises determining whether a first duration time associated with the holistic motion path corresponds to a second duration time associated with the limb animation.

* * * * *